(12) United States Patent
Sato

(10) Patent No.: US 7,099,092 B2
(45) Date of Patent: Aug. 29, 2006

(54) SINGLE FOCUS WIDE-ANGLE LENS

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/075,750

(22) Filed: Mar. 10, 2005

(65) Prior Publication Data

US 2005/0231822 A1 Oct. 20, 2005

(30) Foreign Application Priority Data

Mar. 30, 2004 (JP) ............................ 2004-098420

(51) Int. Cl.
*G02B 9/12* (2006.01)
*G02B 3/02* (2006.01)
*G02B 13/04* (2006.01)

(52) U.S. Cl. .................. 359/791; 359/716; 359/753

(58) Field of Classification Search ............ 359/716, 359/753, 791
See application file for complete search history.

(56) References Cited

U.S. PATENT DOCUMENTS 6,795,253 B1 * 9/2004 Shinohara .................. 359/716
6,844,989 B1 * 1/2005 Jo et al. ..................... 359/716

2004/0021957 A1 2/2004 Isono

FOREIGN PATENT DOCUMENTS

| JP | 2-6917 A | 1/1990 |
| JP | 10-48516 | 2/1998 |
| JP | 2003-322792 A | 11/2003 |

* cited by examiner

*Primary Examiner*—Loha Ben
*Assistant Examiner*—William Choi
(74) *Attorney, Agent, or Firm*—Birch, Stewart, Kolasch, and Birch, LLP

(57) ABSTRACT

A single focus wide-angle lens includes, in order from the object side: a first lens component of positive refractive power, having a meniscus shape, and having a convex object-side surface; a stop; a second lens component of positive refractive power, having a meniscus shape, having at least one aspheric surface, having a concave object-side surface, and being made of plastic; and a third lens component of negative refractive power, having a meniscus or plano-concave or biconcave shape, having both surfaces of aspheric shape, having an image-side surface that is concave on the optical axis, and being made of plastic. The single focus wide-angle lens may include only three lens elements. Specified on-axis conditions are satisfied in order to reduce aberrations and to make the single focus wide-angle lens compact. Additionally, satisfying a condition related to the half-field angle at the maximum image height helps reduce aberrations.

20 Claims, 2 Drawing Sheets

Spherical Aberration

Astigmatism

Distortion

Spherical Aberration

Astigmatism

Distortion

SINGLE FOCUS WIDE-ANGLE LENS

FIELD OF THE INVENTION

The present invention relates to a single focus wide-angle lens that can be mounted in small information terminal equipment such as a cellular telephone with a camera and in a Personal Digital Assistant (PDA).

BACKGROUND OF THE INVENTION

In recent years, digital still cameras (hereinafter referred to simply as digital cameras) that enable input of picture image information, such as photographed landscapes and portraits, into a personal computer have rapidly become popular with the popularity of personal computers in households. In addition, along with advanced functions of cellular phones, camera phones that incorporate compact image pickup modules have also rapidly become popular. Furthermore, including an image pickup module in compact information terminal equipment, such as PDAs, has also become popular.

In such devices that include an image pickup function, an image pickup element, such as a CCD (Charge Coupled Device) or a CMOS (Complementary Metal Oxide Semiconductor), is used to provide the imaging function, and in recent years the size of such image pickup elements has rapidly decreased. Therefore, image pickup devices using such image pickup elements now need to be small and lightweight. Additionally, image pickup elements with a larger number of pixels in the same area have been developed in order to achieve higher image quality, which requires higher resolution lens systems that are still very compact and yet provide excellent imaging performance.

Japanese Laid-Open Patent Application H10-048516 describes exemplary single focus lenses for such devices that include only three lens components, each of which is a lens element, with the image-side lens element having a biconvex shape and being immediately preceded on its object side by an aperture stop.

As described above, recent image pickup elements are smaller and provide more pixels in a given detector area, which helps meet demands of higher resolution and more compactness that are especially required in imaging devices for digital cameras. On the other hand, the primary requirements for image pickup lenses of a small information terminal device, such as a camera phone, are conventionally low cost and compactness. However, recent camera phones tend to have an image pickup element with a larger number of pixels. For example, image pickup elements with megapixel detectors (detectors that detect one million or more pixels) are being used practically. High performance is also increasingly demanded. It is desirable to develop a variety of lenses to meet a variety of user needs considering all the factors together, including cost, performance, and compactness. For example, it is desirable to develop a low cost and high performance image pickup lens that is compact for mounting in a portable modular camera and, based on its high performance, also in a digital camera.

In order to meet these requirements, lenses with three or four lens components, each of which components may be a lens element, have been considered in order to achieve low cost and compactness and to use aspheric surfaces for high performance. However, although aspheric surfaces assist in obtaining compactness and higher performance, they are disadvantageous in terms of productivity and cost. Therefore, aspheric surfaces should be used with careful consideration of productivity. The single focus lenses described in Japanese Laid-Open Patent Application H10-048516 discussed above use three lens components that are lens elements and include aspheric surfaces, but the comprehensive performance of these lenses is unsatisfactory. If the optical performance is made adequate for various purposes, the lenses are not sufficiently compact. Generally, a lens with only three lens elements is sufficient in performance for a portable modular camera, but the performance is insufficient for a digital camera.

BRIEF SUMMARY OF THE INVENTION

The present invention relates to a single focus wide-angle lens with a small number of lens components and lens elements that is capable of realizing high performance and compactness by effectively using aspheric surfaces.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
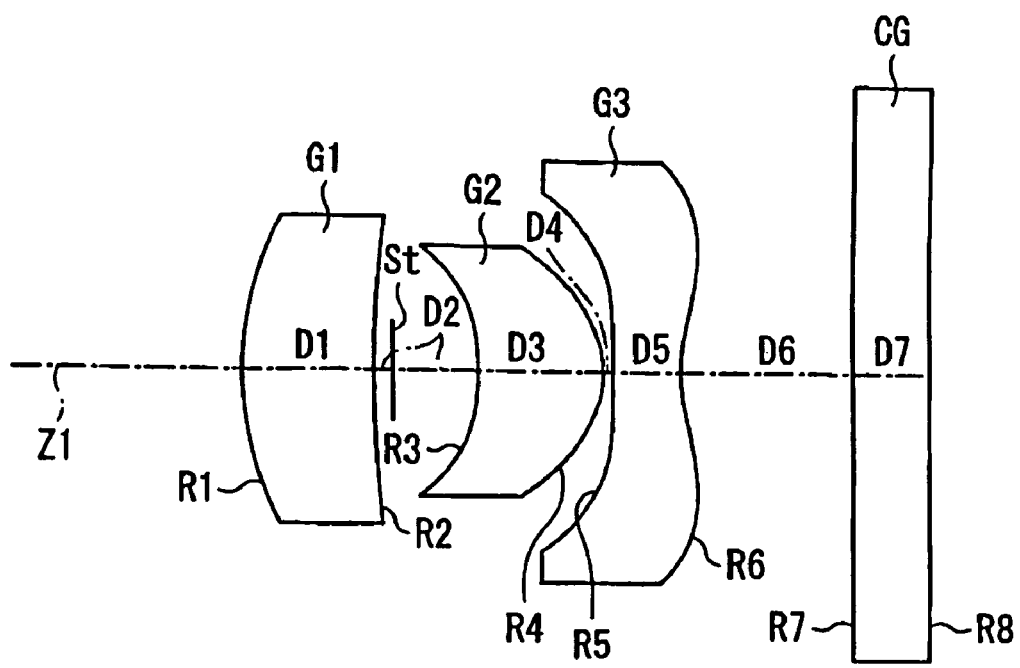
FIG. 1 shows a cross-sectional view of the single focus wide-angle lens according to Embodiment 1.

A general description of preferred embodiments of the single focus wide-angle lens of the present invention will now be described with reference to FIG. 1. FIG. 1 shows a cross-sectional view of the single focus wide-angle lens of Embodiment 1. In FIG. 1, the lens elements of the single focus wide-angle lens are referenced by the symbols G1 to G3, in order from the object side of the single focus wide-angle lens along the optical axis Z1. Additionally, a cover glass on the image side of the third lens element G3 is referenced by the symbol CG. The single focus wide-angle lens further includes a diaphragm stop St that operates as an aperture stop. The radii of curvature of the lens elements G1 to G3, and the cover glass CG are referenced by the letter R followed by a number denoting their order from the object side of the single focus wide-angle lens, from R1 to R8. The on-axis surface spacings along the optical axis Z1 between the surfaces of the optical elements, except for the stop St, are referenced by the letter D followed by a number denoting their order from the object side of the single focus wide-angle lens, from D1 to D7. The single focus wide-angle lens is designed so that a luminous flux of light from an object travels from the object side of the single focus wide-angle lens to the image side of the single focus wide-angle lens in order to form a real image of the object on an image plane (not shown) where an image pickup element, such as a CCD, may be located. Because both Embodiments 1 and 2 of the present invention are very similar, the above descriptions of the invention and much of the descriptions that follow apply to both Embodiments 1 and 2 with FIG. 1 well representing the features of the present invention that are common to Embodiments 1 and 2.

Definitions of the terms "lens element" and "lens component" as used herein will now be given. The term "lens element" is herein defined as a single transparent mass of refractive material having two opposed refracting surfaces, which surfaces are positioned at least generally transversely of the optical axis of the single focus wide-angle lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The single focus wide-angle lens of the present invention can be used, for example, in small information terminal devices, such as portable telephones with cameras, digital cameras, and similar imaging devices, particularly in general small image pickup devices that use image pickup elements. As shown in FIG. 1, the single focus wide-angle lens includes, arranged in order from the object side along the optical axis Z1, the first lens element G1, the stop St, the second lens element G2, and the third lens element G3. An image pickup element, such as a CCD (not shown in the drawings) is arranged at the image plane of the single focus wide-angle lens. The cover glass CG is arranged at or adjacent to the image plane, on the image side of the third lens element G3, so as to protect the image-detecting elements of the CCD. In addition to the cover glass CG, other optical elements such as an infrared cut-off filter and/or a low-pass filter may also be arranged between the third lens element G3 and the image plane.

The first lens element G1 has positive refractive power, has a meniscus shape, has a convex object-side surface, and may, for example, be made of glass.

The second lens element G2 has positive refractive power, has a meniscus shape, has at least one aspheric surface, has a concave object-side surface, and is made of plastic.

Although lenses similar to the present invention have previously included a third lens element of positive refractive power where lens element G3 of the present invention is located, in the single focus wide-angle lens of the present invention, the third lens element G3 has negative refractive power, and it has an image-side surface that is concave on the optical axis. The third lens element G3 may have, for example, a meniscus shape on the optical axis. Alternatively, the third lens element G3 may have a plano-concave shape or a biconcave shape on the optical axis.

The third lens element G3 is made of plastic and both surfaces are aspheric. Preferably, the aspheric object-side surface of the third lens element G3 has increasing negative refractive power in the direction from the optical axis toward the periphery of the object-side surface within the effective diameter of the third lens element G3, and the aspheric image-side surface of the third lens element G3 has increasingly less negative refractive power or increasingly more positive refractive power in the direction from the optical axis toward the periphery of the image-side surface within the effective diameter of the third lens component G3. The alternative "or" language of the previous sentence includes the third lens element G3 having both increasingly less negative refractive power and increasingly more positive refractive power in the direction from the optical axis toward the periphery of the image-side surface within the effective diameter of the third lens component G3. In fact, it is preferable that the image-side surface of the third lens element G3 be, for example, concave near the optical axis and convex toward the periphery so that it includes an area of increasingly less negative refractive power and an area of increasingly more positive refractive power.

The lens surfaces that are aspheric are defined using the following equation:

$$Z = [(C \cdot Y^2)/\{1+(1-K \cdot C^2 \cdot Y^2)^{1/2}\}] + \Sigma(A_i \cdot Y^i) \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is the ith aspheric coefficient, and the summation extends over i.

In the embodiments of the invention disclosed below, aspheric coefficients other than $A_3$–$A_{10}$ are zero for all lens surfaces and some of the aspheric coefficients $A_3$–$A_{10}$ are zero for some of the lens surfaces.

Additionally, the single focus wide-angle lens satisfies the following Conditions (1)–(3):

| | |
|---|---|
| 0.6 < R1/f < 0.8 | Condition (1) |
| −1.0 < f3/f < 0 | Condition (2) |
| 0.60 < tan θ < 0.70 | Condition (3) | where

R1 is the radius of curvature on the optical axis of the object-side surface of the first lens element, f3 is the paraxial focal length of the third lens element, f is the paraxial focal length of the entire single focus wide-angle lens, and θ is the half-field angle at the maximum image height.

If the upper limit of Condition (1) is not satisfied, the overall length of the single focus wide-angle lens becomes too long. If the lower limit of Condition (1) is not satisfied, the correction of curvature of field and spherical aberration becomes undesirably difficult.

If Condition (2) is not satisfied, it also becomes undesirably difficult to correct curvature of field.

Condition (3) limits the half-field angle θ of a maximum image height, that is, the maximum angle of incidence among all the image forming principal rays on the object-side of the first lens element.

In this single focus wide-angle lens, for example, a high performance and compact wide-angle lens system is realized with a low cost and with only three lens components, each of which may be a lens element, by adopting the structure and arrangement of lens elements, cover glass, and stop as described previously with regard to the lens elements G1, G2, and G3, the cover glass CG and the stop St, including satisfying Conditions (1)–(3) above.

In this single focus wide-angle lens, the stop St is arranged between the first lens element G1 and the second lens element G2 and the object-side surface of the first lens element G1 is convex mainly to improve the axial performance of the single focus wide-angle lens.

In this single focus wide-angle lens, a large correction of aberrations is obtained by using aspheric surfaces in the second lens element G2 and the third lens element G3. In this case, the second lens element G2 and the third lens elements G3 are made of plastic, which is favorable in terms of manufacturing the lens elements. Particularly, when the aspheric surface of the third lens element G3 is a special shape such that the shape and the power are different near the optical axis and in the peripheral part, greater correction of aberrations, including correction of curvature of field is possible, with the ease of manufacture that using plastic provides.

Thus, according to the single focus wide-angle lens of the present invention, a low cost high performance image pickup lens suitable for use in digital cameras in terms of performance while satisfying compactness for use in portable modular cameras can be realized with only three lens elements that are lens components and effectively using aspheric surfaces.

Embodiments 1 and 2 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

Embodiment 1

Table 1 below lists the surface number #, in order from the object side, the radius of curvature R (in mm) of each surface on the optical axis, the on-axis surface spacing D (in mm), as well as the refractive index $N_d$ and the Abbe number $v_d$ (both at the d-line of 587.6 nm) of each optical element, including the cover glass CG but excluding the stop St, for Embodiment 1. Listed in the bottom portion of Table 1 are the paraxial focal length f, the f-number $F_{NO}$, and the maximum field angle 2ω at the d-line of 587.6 nm.

TABLE 1

| # | R | D | $N_d$ | $v_d$ |
|---|---|---|---|---|
| 1 | 3.3394 | 1.40 | 1.65830 | 57.3 |
| 2 | 13.5166 | 1.10 | | |
| 3* | −2.3308 | 1.30 | 1.50869 | 56.0 |
| 4* | −1.0230 | 0.10 | | |
| 5* | 27.3563 | 0.70 | 1.50869 | 56.0 |
| 6* | 1.5147 | 1.82 | | |
| 7 | ∞ | 0.80 | 1.51680 | 64.2 |
| 8 | ∞ | | | |
| f = 5.15 mm $F_{NO}$ = 4.0 2ω = 65.0° | | | | |

The surfaces with a * to the right of the surface number in Table 1 are aspheric lens surfaces, and the aspheric surface shapes are expressed by Equation (A) above.

Table 2 below lists the values of the constant K and the aspheric coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| # | K | $A_3$ | $A_4$ | $A_5$ | $A_6$ | $A_7$ | $A_8$ | $A_9$ | $A_{10}$ |
|---|---|---|---|---|---|---|---|---|---|
| 3 | −15.8678 | 0 | −1.6491E−1 | 0 | 2.7121E−3 | 0 | 5.0444E−3 | 0 | 1.0549E−3 |
| 4 | −0.8145 | 0 | −1.9480E−2 | 0 | −4.4776E−2 | 0 | 2.6526E−3 | 0 | 2.9618E−3 |
| 5 | −0.3226 | −6.4377E−2 | 4.3582E−2 | −8.8040E−2 | −4.5759E−3 | 2.2064E−2 | −8.0373E−5 | 1.2780E−3 | −1.5703E−3 |
| 6 | −0.8302 | −6.4513E−2 | −1.8280E−1 | 1.3160E−1 | −1.612E−2 | −1.8403E−2 | 8.1821E−3 | −1.0329E−3 | −1.8140E−5 |

The single focus wide-angle lens of Embodiment 1 satisfies Conditions (1)–(3) above, as set forth in Table 3 below.

TABLE 3

| Condition No. | Condition | Value |
|---|---|---|
| (1) | 0.6 < R1/f < 0.8 | 0.65 |
| (2) | −1.0 < f3/f < 0 | −0.62 |
| (3) | 0.60 < tan θ < 0.70 | 0.64 |

Figure 3A:
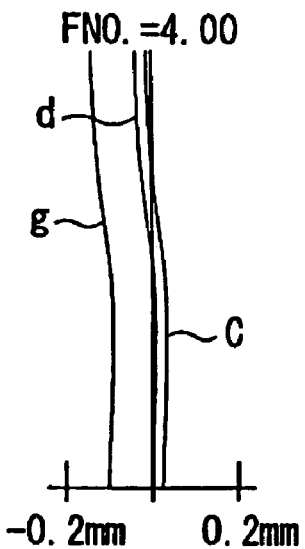
FIGS. 3A–3C show the spherical aberration, astigmatism, and distortion, respectively, of the single focus wide-angle lens according to Embodiment 1.
Figure 3B:
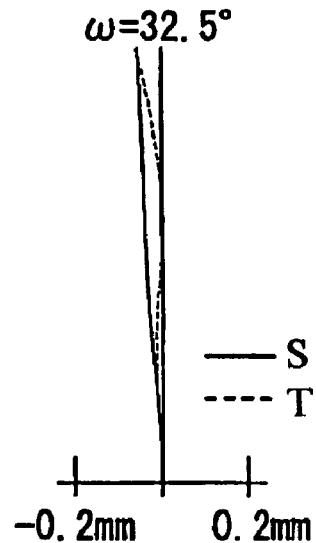
Figure 3C:
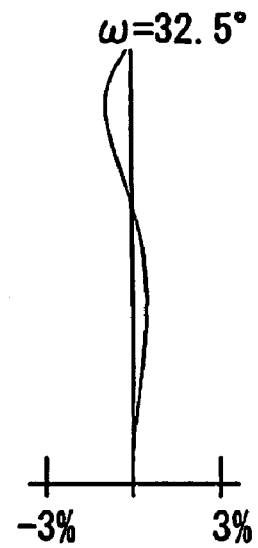

FIGS. 3A–3C show the spherical aberration, astigmatism, and distortion, respectively, of the single focus wide-angle lens of Embodiment 1. In FIG. 3A, the spherical aberration is shown for the wavelengths 587.6 nm (the d-line), 435.8 nm (the g-line), and 656.3 nm (the C-line). In FIGS. 3B and 3C, ω is the half-field angle. In FIG. 3B, the astigmatism is shown for the sagittal image surface S and the tangential image surface T at 587.6 nm (the d-line). In FIG. 3C, the distortion is measured at 587.6 nm (the d-line). The half-field angle ω for FIGS. 3B and 3C is 32.5°.

As is clear from the lens data and aberration curves discussed above, in Embodiment 1 the various aberrations are favorably corrected, and a compact single focus wide-angle lens with a small number of lens elements and lens components is realized.

Embodiment 2

Figure 2:
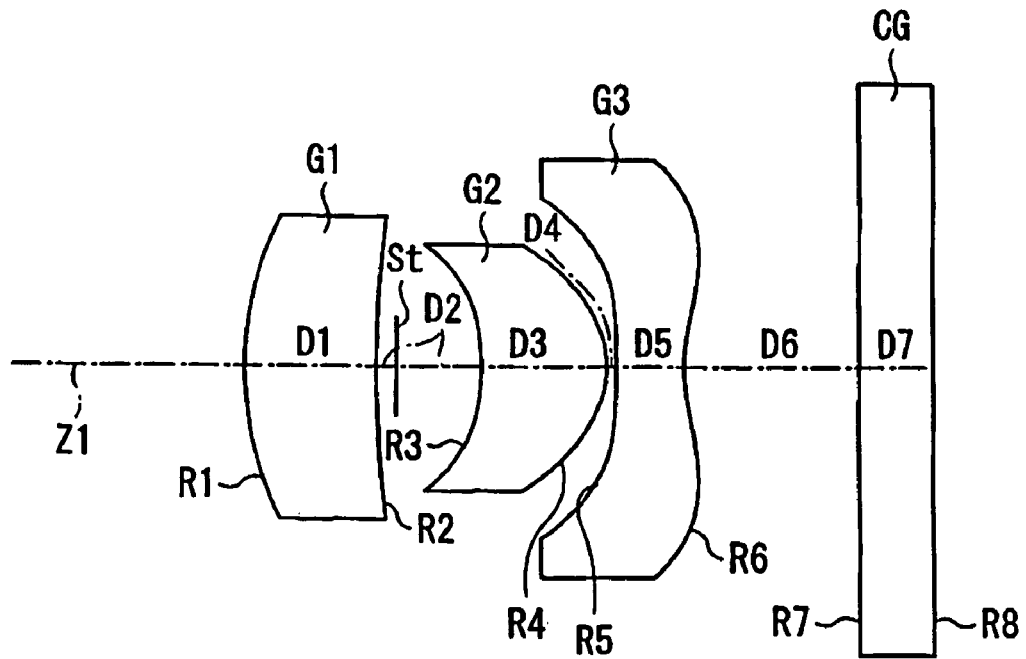
FIG. 2 shows a cross-sectional view of the single focus wide-angle lens according to Embodiment 2.

FIG. 2 shows Embodiment 2 of the present invention. Embodiment 2 is similar to Embodiment 1 and therefore only the differences between Embodiment 2 and Embodiment 1 will be explained. In this Embodiment, instead of the object side lens surface of the third lens element G3 being convex on the optical axis, it is concave on the optical axis.

Table 4 below lists the surface number #, in order from the object side, the radius of curvature R (in mm) of each surface on the optical axis, the on-axis surface spacing D (in mm), as well as the refractive index $N_d$ and the Abbe number $v_d$ (both at the d-line of 587.6 nm) of each optical element, including the cover glass CG but excluding the stop St, for Embodiment 2. Listed in the bottom portion of Table 4 are the paraxial focal length f, the f-number $F_{NO}$, and the maximum field angle 2ω at the d-line of 587.6 nm.

TABLE 4

| # | R | D | $N_d$ | $v_d$ |
|---|---|---|---|---|
| 1 | 3.5740 | 1.40 | 1.71300 | 53.9 |
| 2 | 13.0040 | 1.10 | | |
| 3* | −2.4725 | 1.30 | 1.50869 | 56.0 |

TABLE 4-continued

| # | R | D | $N_d$ | $v_d$ |
|---|---|---|---|---|
| 4* | −1.0202 | 0.10 | | |
| 5* | −51.7886 | 0.70 | 1.50869 | 56.0 |
| 6* | 1.6454 | 1.86 | | |
| 7 | ∞ | 0.80 | 1.51680 | 64.2 |
| 8 | ∞ | | | |
| | f = 5.19 mm $F_{NO}$ = 4.0 2ω = 65.2° | | | |

The surfaces with a * to the right of the surface number in Table 4 are aspheric lens surfaces, and the aspheric surface shapes are expressed by Equation (A) above.

Table 5 below lists the values of the constant K and the aspheric coefficients $A_3$–$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E−2" represents the number $1.0 \times 10^{-2}$.

TABLE 5

| # | K | $A_3$ | $A_4$ | $A_5$ | $A_6$ | $A_7$ | $A_8$ | $A_9$ | $A_{10}$ |
|---|---|---|---|---|---|---|---|---|---|
| 3 | −18.0304 | 0 | −1.6550E−1 | 0 | 6.3197E−3 | 0 | 4.5407E−3 | 0 | 9.5460E−4 |
| 4 | −0.7050 | 0 | −1.8965E−2 | 0 | −4.7000E−2 | 0 | 3.0359E−3 | 0 | 3.2408E−3 |
| 5 | −0.3226 | −6.0937E−2 | 3.4720E−2 | −9.2292E−2 | −3.3102E−3 | 2.4522E−2 | 1.6054E−4 | 9.9774E−4 | −1.7452E−3 |
| 6 | −0.7561 | −5.4837E−2 | −1.9481E−1 | 1.3200E−1 | −1.4537E−2 | −1.8179E−2 | 7.9283E−3 | −1.0772E−3 | 3.8945E−6 |

The single focus wide-angle lens of Embodiment 2 satisfies Conditions (1)–(3) above, as set forth in Table 6 below.

TABLE 6

| Condition No. | Condition | Value |
|---|---|---|
| (1) | 0.6 < R1/f < 0.8 | 0.69 |
| (2) | −1.0 < f3/f < 0 | −0.60 |
| (3) | 0.60 < tan θ < 0.70 | 0.64 |

Figure 4A:
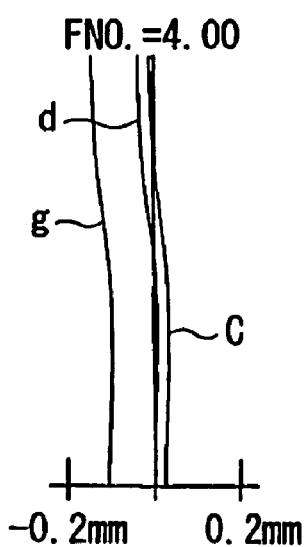
FIGS. 4A–4C show the spherical aberration, astigmatism, and distortion, respectively, of the single focus wide-angle lens according to Embodiment 2.
Figure 4B:
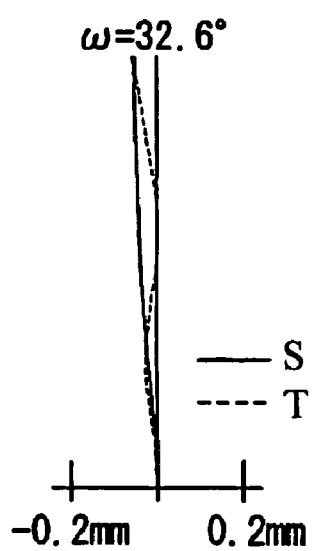
Figure 4C:
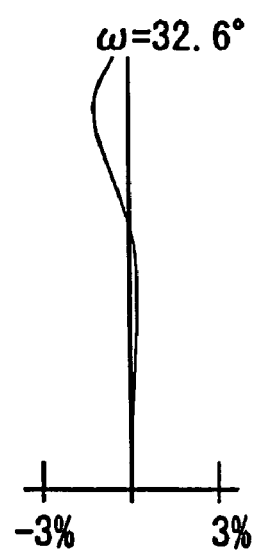

FIGS. 4A–4C show the spherical aberration, astigmatism, and distortion, respectively, of the single focus wide-angle lens of Embodiment 2. In FIG. 4A, the spherical aberration is shown for the wavelengths 587.6 nm (the d-line), 435.8 nm (the g-line), and 656.3 nm (the C-line). In FIGS. 4B and 4C, ω is the half-field angle. In FIG. 4B, the astigmatism is shown for the sagittal image surface S and the tangential image surface T at 587.6 nm (the d-line). In FIG. 4C, the distortion is measured at 587.6 nm (the d-line). The half-field angle ω for FIGS. 4B and 4C is 32.6°.

As is clear from the lens data and aberration curves discussed above, in Embodiment 2 the various aberrations are favorably corrected, and a compact single focus wide-angle lens with a small number of lens elements and lens components is realized.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus wide-angle lens for forming a real image of an object that is positioned on the object side of the single focus wide-angle lens, the single focus wide-angle lens comprising, arranged along an optical axis in order from the object side:

a first lens component of positive refractive power, having a meniscus shape, and having a convex object-side surface;

a stop;

a second lens component of positive refractive power, having a meniscus shape, having at least one aspheric surface, having a concave object-side surface, and being made of plastic; and a third lens component of negative refractive power, having both surfaces of aspheric shape, having an image-side surface that is concave on the optical axis, and being made of plastic; wherein the following conditions are satisfied:

$$0.6 < R1/f < 0.8$$

$$-1.0 < f3/f < 0$$

$$0.60 < \tan\theta < 0.70$$

where

R1 is the radius of curvature on the optical axis of the object-side surface of the first lens component, f3 is the paraxial focal length of the third lens component, f is the paraxial focal length of the entire single focus wide-angle lens, and θ is the half-field angle at the maximum image height.

2. The single focus wide-angle lens of claim 1, wherein the first lens component is a lens element, the second lens component is a lens element, and the third lens component is a lens element.

3. The single focus wide-angle lens of claim 2, wherein the third lens component has a meniscus shape on the optical axis.

4. The single focus wide-angle lens of claim 2, wherein the third lens component has a plano-concave shape or a biconcave shape on the optical axis.

5. The single focus wide-angle lens of claim 1, wherein the first lens component, the stop, the second lens component, and the third lens component are arranged in that order along the optical axis from the object side without any intervening lens element.

6. The single focus wide-angle lens of claim 5, wherein each of the first, second, and third lens components consists of a lens element.

7. The single focus wide-angle lens of claim 6, wherein the third lens component has a meniscus shape on the optical axis.

8. The single focus wide-angle lens of claim 6, wherein the third lens component has a plano-concave shape or a biconcave shape on the optical axis.

9. The single focus wide-angle lens of claim 6, wherein:
the aspheric object-side surface of the third lens component has increasing negative refractive power in the direction from the optical axis toward the periphery of the object-side surface within the effective diameter of the third lens component; and
the aspheric image-side surface of the third lens component has increasingly less negative refractive power or increasingly more positive refractive power in the direction from the optical axis toward the periphery of the image-side surface within the effective diameter of the third lens component.

10. The single focus wide-angle lens of claim 5, wherein the third lens component has a meniscus shape on the optical axis.

11. The single focus wide-angle lens of claim 5, wherein the third lens component has a plano-concave shape or a biconcave shape on the optical axis.

12. The single focus wide-angle lens of claim 1, wherein the single focus wide-angle lens is formed of only three lens components.

13. The single focus wide-angle lens of claim 12, wherein the single focus wide-angle lens is formed of only three lens elements.

14. The single focus wide-angle lens of claim 13, wherein the third lens component has a meniscus shape on the optical axis.

15. The single focus wide-angle lens of claim 13, wherein the third lens component has a plano-concave shape or a biconcave shape on the optical axis.

16. The single focus wide-angle lens of claim 13, wherein:
the aspheric object-side surface of the third lens component has increasing negative refractive power in the direction from the optical axis toward the periphery of the object-side surface within the effective diameter of the third lens component; and
the aspheric image-side surface of the third lens component has increasingly less negative refractive power or increasingly more positive refractive power in the direction from the optical axis toward the periphery of the image-side surface within the effective diameter of the third lens component.

17. The single focus wide-angle lens of claim 1, wherein the third lens component has a meniscus shape on the optical axis.

18. The single focus wide-angle lens of claim 17, wherein:
the aspheric object-side surface of the third lens component has increasing negative refractive power in the direction from the optical axis toward the periphery of the object-side surface within the effective diameter of the third lens component; and
the aspheric image-side surface of the third lens component has increasingly less negative refractive power or increasingly more positive refractive power in the direction from the optical axis toward the periphery of the image-side surface within the effective diameter of the third lens component.

19. The single focus wide-angle lens of claim 1, wherein the third lens component has a plano-concave shape or a biconcave shape on the optical axis.

20. The single focus wide-angle lens of claim 1, wherein:
the aspheric object-side surface of the third lens component has increasing negative refractive power in the direction from the optical axis toward the periphery of the object-side surface within the effective diameter of the third lens component; and
the aspheric image-side surface of the third lens component has increasingly less negative refractive power or increasingly more positive refractive power in the direction from the optical axis toward the periphery of the image-side surface within the effective diameter of the third lens component.

* * * * *